Feb. 11, 1969   J. W. MAYO   3,427,047
TUBULAR COUPLING HAVING FRANGIBLE CONNECTING MEANS
Filed Nov. 30, 1966

INVENTOR
JAMES W. MAYO

BY

ATTORNEYS

United States Patent Office 3,427,047
Patented Feb. 11, 1969

3,427,047
TUBULAR COUPLING HAVING FRANGIBLE CONNECTING MEANS
James W. Mayo, Newport News, Va., assignor to the United States of America as represented by the Administrator of the National Aeronautics and Space Administration
Filed Nov. 30, 1966, Ser. No. 598,118
U.S. Cl. 285—3                                        4 Claims
Int. Cl. F16l 15/00, 25/00

ABSTRACT OF THE DISCLOSURE

The invention contemplates the use of a metal sheathed explosive, such as a mild detonating fuse, wire of bimetallic compositions which exothermically deflagrate, or wire of a material having a selected melting point, which is used as a threaded insert or shear ring to provide a sound mechanical joint that will surrender its mechanical properties upon command or upon reaching a temperature in excess of those required for joint integrity.

Specification

The invention described herein was made by an employee of the United States Government and may be manufactured and used by or for the Government for governmental purposes without the payment of any royalties thereon or therefor.

Previously, various systems have been utilized to accomplish the separation of rocket stages. Such devices do not themselves provide separation of the stages but merely retain the stages in juxtaposition until a predetermined event or condition exists at which point the devices permit disconnection of the stages and thus separation of adjacent portions of an aerospace vehicle. Prior art devices include such items as the clamping band, commonly referred to as a Marman band, explosive bolts, linear shaped charges, and a diaphragm that fragmentates or deflects to disengage threaded members securing the adjacent stages. Each of these previously known devices has worked satisfactorily and some are presently in use for stage separation.

However, these priorly known devices for permitting stage separation have various disadvantages. For example, the clamping band, explosive bolts and linear shaped charges have the shock of explosion, fragmentation and debris from the components that cause various undesirable affects on the stages of the vehicle. The diaphragm generally has a limited area of location in the structure and its dependency on subsequent rocket motor firing to accomplish separation limits its application as well as introducing disturbances to the separating stages.

In view of the above discussion it is an object of this invention to provide a sound mechanical joint or connection which can be instantaneously released.

Another object of the instant invention is to provide a joint which permits ease of assembly and which can be released upon command or upon the existence of certain environmental conditions.

Still another object of this invention is to provide mating connector elements on adjacent stages of an aerospace vehicle with a frangible insert threaded in helical grooves on abutting flange faces of the elements to permit separation of the stages upon detonation of the insert.

A still further object of this invention is to provide a stage connection wherein adjacent stages of an aerospace vehicle are provided respectively with male and female flanges that interfit with helical grooves in the abutting faces of the flange and into which an explosive wire is threaded with vent holes connecting the grooves and atmosphere to release pressures caused by detonation of the threaded insert.

A more complete appreciation of the invention and many of the attendant advantages thereof will be readily apparent as the same becomes better understood by reference to the following description when considered in connection with the accompanying drawings wherein.

Figure 1:
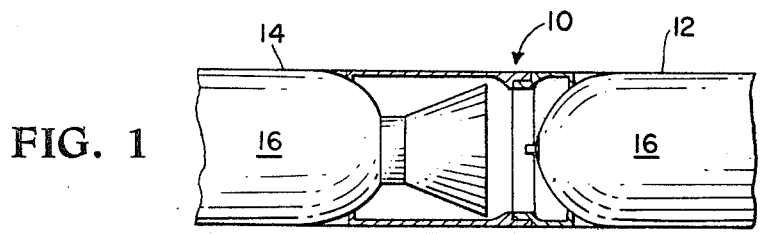
FIG. 1 is an overall sectional view of the general installation of the connection of the instant invention.

Referring now to FIG. 1 wherein the instant inventive connector is generally shown by numeral 10 as connecting lower stage 12 and upper stage 14 of an aerospace vehicle. Stages 12 and 14 are powered by conventional rocket devices 16.

Figure 2:
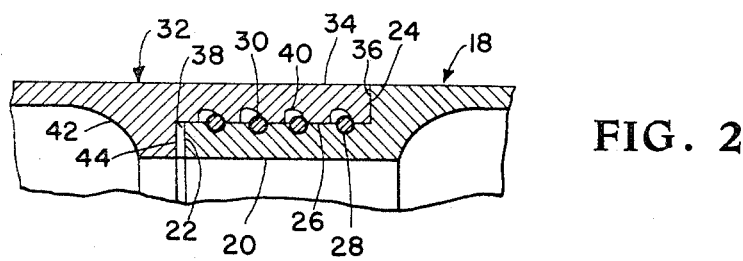
FIG. 2 is an enlarged view of the assembled joint of FIG. 1.
Figure 3:
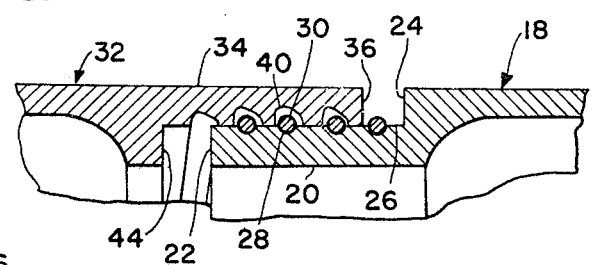
FIG. 3 is another enlarged sectional view of the connection of FIG. 2 during assembly.

As best seen in FIGS. 2 and 3 lower stage 12 has male connector element 18 which includes inwardly offset flange 20 having end face 22 thereon and offsetting end face 24. The outwardly directed surface 26 of flange 20 has helically arranged semicircular grooves 28 formed therein for a purpose to be more fully described hereinafter. Upper stage 14 has female connector element 32 on the lower edge thereof for mating engagement with connector element 18. Outer flange 34 on connector element 32 includes end face 36 and inner surface 38 having helically arranged grooves 40 forming threads. Grooves 28 and 40 are so positioned that they substantially mate with one another to receive deflagratable insert 30. Projection 42 includes end face 44 for a purpose to be described more fully hereinafter.

Figure 4:
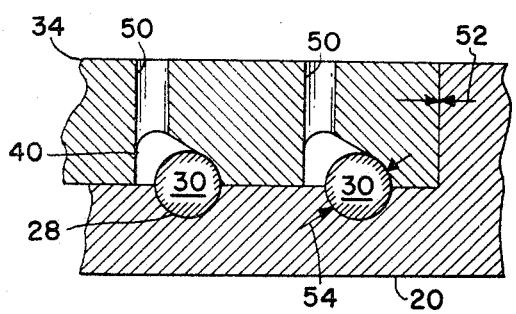
FIG. 4 is an even further enlarged sectional view of the joint of FIGS. 2 and 3 showing the instant invention in greater detail.

Referring to FIGS. 2 and 3 the process of assembly is readily apparent. Frangible insert 30 may be inserted into grooves 28 and connector element 32 rotated to threadingly engage grooves 40 with insert 30 and thereby provide a sound mechanical joint. As is apparent from an inspection of FIG. 3, considerable clearance is provided in the grooves 40 so that during assembly the respective elements may be rotated and advanced without using the insert 30 as a driving surface and without sliding contact between the element 30 and either of the elements 18 or 32. Thus, assembly may be easily accomplished without overcoming high frictional loads, or deleterious scraping of the insert element 30. As seen in FIG. 2, once the elements 18 and 32 have been advanced to the point that the abutment of faces 24 and 36 occurs, further relative rotation occurs without relative linear movement, and the resulting changing relative position of grooves 28 and 40 forces the leading contours of the groove 40 into engagement with the insert 30, and hence a sound mechanical connection has been rendered between the elements 18 and 32. This situation is seen in FIG. 4 which also shows the clearance cavity formed on the trailing side of the grooves 40. It is also contemplated that insert 30 could be forced into grooves 28 and 40 after male connector 18 and female connector 32 have been matingly assembled. As best seen in FIG. 2, after assembly of connector 10 faces 24 and 36 of elements 18 and 32, respectively, are in a force transmitting abutment with faces 26 and 38 in juxtaposition to one another. Although FIG. 2 shows a minimal spacing between faces 22 and 44 on connector elements 18 and 32 respectively, it is to be understood that in some instances it may be desirabe to eliminate such spacing and provide for the transmittal of forces from stage 12 to upper stage 14 by abutment of faces 22 and 44 as well as 24 and 36.

Referring now to FIG. 4, wherein an enlarged view of a portion of the connector of FIGS. 2 and 3 is shown to have vent holes 50 connecting grooves 40 with the atmosphere surrounding upper stage 14. Arrows 52 and 54 designate the direction that the loads go to reaction during launch and propulsion.

When stages 12 and 14 have been assembled with connector 10 effecting a positive connection through flanges 20 and 34 and their respective threaded engagement of desolidifiable insert 30, it is merely necessary to activate a conventional device, not shown, that will effect detonation or melting of insert 30 to permit disengagement or separation of connector elements 18 and 32. The gaseous or other pressure caused by the detonation or melting of insert 30 is vented to the atmosphere through vent holes 50 to thereby prevent undesirable deformation of the respective connector elements 18 and 32.

Figure 5:
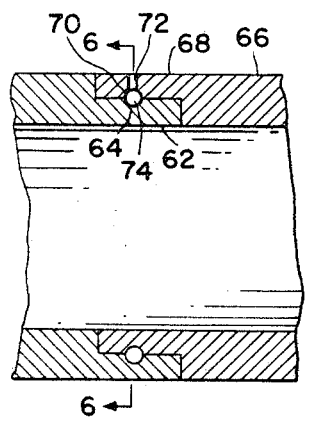
FIG. 5 is a sectional view similar to FIG. 2 showing an alternative embodiment of the instant invention.
Figure 6:
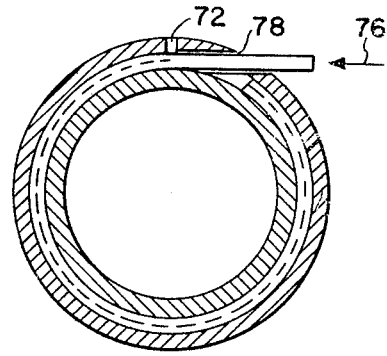
FIG. 6 is a view of the connection of FIG. 5 taken on line 6—6 thereof.

Referring now to FIGS. 5 and 6 wherein an alternative embodiment of the instant invention is shown as providing a retaining ring. First member 60 has inwardly offset male flange 62 extending therefrom with semicircular groove 64 in the outer face of flange 62. Second member 66 includes outward female flange 68 having groove 70 on the inner face thereof in a position to match the groove 64 of inner flange 62. Vent hole 72 connects the atmosphere with groove 70 to permit release of undesirable pressures during effectuation of the release of insert 74. As seen in FIG. 6, arrow 76 indicates the direction of force utilized to insert retaining ring 74 into mating grooves 64 and 70 after members 60 and 66 have been assembled. Obviously it is necessary to provide access opening 78 for insertion of retaining ring 74.

It is readily apparent that the insert will maintain the mechanical or structural integrity of the joint until it changes its state from a solid to a liquid or gas. It can, in the case of the mild detonating fuse or the exothermic wire, be initiated by the use of present state-of-the-art pyrotechnic devices or be changed in state from a solid to a liquid or gas by heating of the material. The liquid and/or gasses would be expelled through the vent holes whereupon the insert material would be in a state to permit free disengagement of the joint. The type of insert material or the shape of the material or groove need not be restricted to that specified herein. As can be seen, any material which changes its matter from a solid, load carrying member into a liquid or gas could be utilized. Special insert materials and shapes, as well as the dimensions of the groove, can be utilized to provide a more effective joint and relatively smaller inserts can also be produced for use with bolts and screws. A simple example of such a connector would be an insert made of an exothermic wire shaped in the form of the commercially available helical coiled inserts which would release the bolt when the temperature reaches the melting point, where exothermic action takes place, or on command of a conventional pyrotechnic ignition system.

The above description makes it readily apparent that this invention has a particular advantage over the prior art because it provides a very lightweight means of effecting a mechanical joint which can be instantaneously released. It is evident that the structure is extremely simple in design with no moving parts to thereby provide high reliability while avoiding the disadvantages of the known devices by eliminating undesirable shock and debris. It is also apparent that the instant invention can be applied to a wide range of sizes and have cross-sectional shapes other than circular to enhance the load carrying capabilities of the joint.

Obviously, many modifications and variations of the subject invention are possible in the light of the above teachings. It is, therefore, to be understood that within the scope of the appended claims the invention may be practised otherwise than as specifically described.

What is claimed as new and desired to be secured by Letters Patent of the United States:

1. An insert connector assembly for coupling a pair of primary members of an aerospace vehicle comprising:
    male and female connector elements each connected to a respective primary member, said male element slidingly fitted into said female element, and both of said elements having complementary helical grooves formed therein on the interior and exterior portions respectively of said female and male elements;
    abutment means limiting sliding movement of said male element into said female element;
    an insert element composed of a desolidifiable material disposed in said grooves, and the cross sections of said insert and said grooves being formed so as to tightly interfit said insert with the grooves of one of said members and loosely interfit with the other, whereby said members may be assembled with little frictional contact but form a tight mechanical connection when said members have been advanced to the limit of movement allowed by said abutment means, and whereby the insert means may be selectively desolidified to permit separation of the male and female connector elements.

2. The assembly of claim 1 wherein the said groove formed in said other member has an asymmetrical cross section formed to engage the leading side of said insert element and having a clearance cavity on the trailing side.

3. The assembly of claim 1 wherein said desolidifiable insert element is composed of a deflagratable material.

4. The assembly of claim 2 wherein vent holes are formed through said other element from the clearance cavity.

References Cited

UNITED STATES PATENTS

| | | | |
|---|---|---|---|
| 2,751,238 | 6/1956 | Vegren | 151—14 |
| 2,805,089 | 9/1957 | Hansen | 285—321 X |
| 3,017,836 | 1/1962 | Guay | 102—49.5 |
| 3,026,772 | 3/1962 | Moreland | 102—49.5 X |
| 3,062,568 | 11/1962 | Andersen et al. | 85—46 X |
| 3,107,421 | 10/1963 | Turnbull | 285—287 X |
| 2,992,017 | 7/1961 | Dritz | 285—41 X |

THOMAS F. CALLAGHAN, *Primary Examiner.*

U.S. Cl. X.R.

102—49.5; 151—14; 285—305, 390